(12) United States Patent
Mihaylo et al.

(10) Patent No.: US 7,818,295 B2
(45) Date of Patent: Oct. 19, 2010

(54) METHODS FOR HANDLING COMMUNICATION REQUESTS RECEIVED FOR FORMER USERS OF A COMMUNICATION SYSTEM

(75) Inventors: Steven G. Mihaylo, Reno, NV (US); Robert Lawrence Gallick, Phoenix, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 755 days.

(21) Appl. No.: 11/062,709

(22) Filed: Feb. 22, 2005

(65) Prior Publication Data

US 2006/0190531 A1 Aug. 24, 2006

(51) Int. Cl.
*G06F 17/30* (2006.01)

(52) U.S. Cl. .................. 707/618; 707/630; 707/635; 707/694; 707/695

(58) Field of Classification Search ............ 707/10, 707/200, 201, 3, 4
See application file for complete search history.

(56) References Cited

U.S. PATENT DOCUMENTS 6,247,043 B1   6/2001 Bates et al.
6,363,248 B1 *  3/2002 Silverman ............... 455/417
6,373,940 B2    4/2002 Shaffer et al.
6,405,243 B1 *  6/2002 Nielsen ................... 709/206
6,438,583 B1 *  8/2002 McDowell et al. ....... 709/206
6,442,567 B1 *  8/2002 Retallick et al. ........ 707/104.1
6,633,311 B1   10/2003 Douvikas et al.
6,687,362 B1    2/2004 Lindquist et al.
6,760,727 B1    7/2004 Schroeder et al.
2002/0160757 A1 * 10/2002 Shavit et al. ............. 455/414
2003/0210780 A1 * 11/2003 Pratt et al. ............. 379/428.01
2004/0003030 A1 *  1/2004 Abe ..................... 709/203
2004/0024823 A1 *  2/2004 Del Monte .............. 709/206
2005/0135333 A1 *  6/2005 Rojas ..................... 370/352
2005/0243993 A1 * 11/2005 McKinzie et al. ....... 379/355.04

* cited by examiner

*Primary Examiner*—Baoquoc N To
(74) *Attorney, Agent, or Firm*—Michelle Whittington

(57) ABSTRACT

The methods for handling a communication request received for a former user of a communication system include sending updated address book information for the former user to an initiator's address book, redirecting the communication request to the forwarding address for the former user, redirecting the communication request to an assigned replacement of the former user, or any combination of the above. Additionally, the replacement's address book information may be sent to the initiator's address book for updating. In one embodiment, a replication of the former user's address book is retained to assist in determining how to handle the received communication request.

17 Claims, 2 Drawing Sheets

METHODS FOR HANDLING COMMUNICATION REQUESTS RECEIVED FOR FORMER USERS OF A COMMUNICATION SYSTEM

FIELD OF INVENTION

The present invention relates generally to methods for handling communication requests received for former users of a communication system. In particular, the various methods include redirecting communication requests received for former users and/or updating the initiator's address book with current contact information.

BACKGROUND OF THE INVENTION

Communication systems typically include address books for users of the system. These address books contain contact information for personal lists created by the user, company-wide contact lists available for all company users, or both. The address book information may be integrated within the system to include a variety of contact information for each contact, such as telephone, email, and physical addresses. Typically, the user can initiate communication to an address book contact quickly by selecting the contact from the list, e.g., mouse-click, stylus, highlight, etc., and the mode of communication, e.g., phone call.

As long as the contact information is accurate, address books are a highly useful and efficient tool. One problem is that contact information is ever-changing. For instance, contacts may change employers or service providers and thus, the contact's address and information changes. Maintaining updated information for contacts is critical to retain the accuracy of the address book and to facilitate communication with the contact, as well as for the contacts attempting to reach the user.

Microsoft® Office Outlook®, one of the leading contact management platforms, offers a variety of techniques to update address books. Outlook's scheme is based on simple file replication updates between peers. This allows a group of contacts to remain updated between participating peers but, unfortunately, does not update with the larger Internet community.

Software products are available to augment the Outlook products by replicating update information between different systems. However, these products often require a subscription to special networked communities that are paid for and managed outside of the user's enterprise. Additionally, these products typically require installation of special plug-ins and other software that must be purchased, installed and maintained on an already complex user desktop environment.

A unique communication problem arises when a user permanently leaves an employer. For example, let's assume Steve terminates employment at ABC Company and begins working at XYZ Company. It is likely that his business and personal contacts will continue to attempt to reach Steve at ABC for some time after his departure. Assuming Steve's extension has not been given to another employee, ABC can reject calls to Steve's previous number and then route the call to an operator or to Steve's new number at XYZ Company. However, Company ABC is not in the business of permanently routing prior employee's phone calls. Moreover, ABC may be unknowingly transferring new business from ABC directly to XYZ Company.

Accordingly, it would be advantageous to redirect communications to new contact information as well as automatically update the caller's address book with the new information. Additionally, it would be desirable to screen communications to answer the calls that are directed to the business so that callers are not redirected outside the company erroneously.

SUMMARY OF THE INVENTION

Methods for handling a communication request received for a former user of a communication system include receiving the communication request at the communication system from a first party. The first party having an address book with address information for a plurality of contacts. The system determines the former user has a forwarding address with new communication information. The system determines the forwarding address is allowed to be sent from the communication system to the address book of the first party and sends a command to the address book of the first party to update the book with the new communication information for the former user.

In another embodiment, the methods for handling a communication request received for a former user of a communication system include receiving the communication request at the communication system from an initiating system. The system determines the former user has a forwarding address with new contact information. The system determines the communication request is allowed to be redirected to the forwarding address and sends a command to the initiating system to redirect the communication request to the forwarding address of the former user.

In yet another embodiment, the methods for handling a communication request received for a former user of a communication system include receiving the communication request at the communication system from a first party. The first party having an address book with communication information for a plurality of contacts. The system refers to a replication of a contacts list of communication information for a plurality of contacts associated with the former user. From the replication, the system determines the communication request is allowed to be redirected to a forwarding address of the former user and determines the forwarding address of the former user is allowed to be sent to update the address book of the first party. A command is sent to the first party to perform actions in response to the determinations.

BRIEF DESCRIPTION OF THE DRAWINGS

These and other features, aspects, and advantages may be best understood by reference to the following description taken in conjunction with the accompanying drawings, wherein like reference numerals indicate similar elements.

DETAILED DESCRIPTION

Although described herein with respect to a former user that has left the company, it should be realized that the disclosure is not so limiting. The methods described herein are equally useful for users that have moved to a different location or address within the same company. In other words, "former" as used herein is intended to have a broad meaning with respect to any former user of the address used in the communication request.

Figure 1:
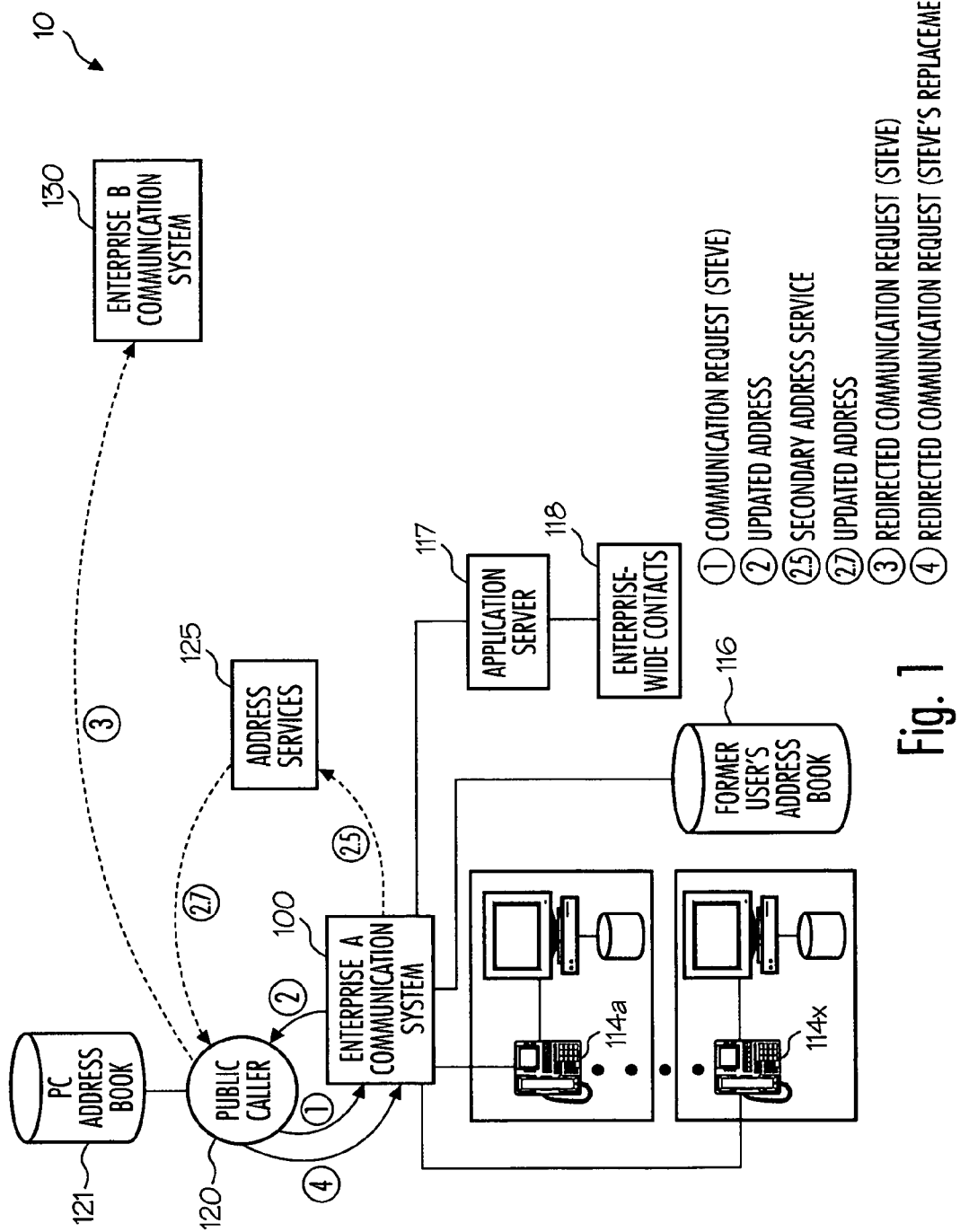
FIG. 1 is an exemplary system and data flow diagram for implementing the various methods for handling communication requests for former users of a communication system.

FIG. 1 illustrates an exemplary data flow diagram within an exemplary system 10 in accordance with the various embodiments. To demonstrate the functionality of the various embodiments, it is helpful to describe the operations by way of an example. For sake of illustrative purposes only, the following description assumes that a caller, e.g., public caller 120, is attempting to communicate with "Steve" and unbeknownst to the caller, Steve is no longer associated with Enterprise A. Public caller 120 places a communication request (1) to Steve, which is received at Enterprise A Communication System 100. Caller 120 may have initiated the communication directly from a local address book 121 or referred to the book for the contact information. Alternatively, the caller's address book may not yet contain contact information for the desired callee and the caller uses another means to initiate communication. For ease of, discussion, it is assumed that the communication is a telephone call, however it should be realized that the disclosure is not so limiting. Rather, the various embodiments are available for a variety of types of communications, such as email, instant messaging and other real-time communications. Additionally, for purposes of the disclosure it is not critical what kind of communication device is used to initiate or respond to communications, only that preferably the device be capable of storing, retrieving, or associating contact information and that the device be capable of supporting real-time communications and/or messages.

Enterprise A Communication System 100 includes various communication hardware and software tools that are typical to business communications. For example, system 100 preferably includes a call routing and switching system such as a PBX, hybrid PBX or softswitch, gateway functions, messaging servers and databases. System 100 further includes an application server 117 and preferably an enterprise-wide contacts database 118. The operations of the present disclosure may be contained in a suitable software product, program, routine and/or series of code that may reside on or in communication with application server 117. In accordance with the disclosure, system 100 may further include a copy or replication of the former users' address books 116. The particular features of the communication elements as they pertain to the inventive disclosure will be discussed in detail below.

System 100 has a plurality of associated endpoints 114a-114x corresponding to users of the system. Used herein, "endpoints" may include telephones (stationary and portable), keysets, personal computers, computing devices, personal digital assistants, pagers, wireless remote clients, messaging devices, and any other communication device capable of transmitting and receiving communication signals. The endpoints may be coupled to the system and its individual components by LAN, WAN or any other suitable communication channel. In particular embodiments, some or all of the endpoints may include a processor, memory, network interface, user I/O and power conversion, as needed, to establish the device as an operational unit or other real-time communicating device connected to a packet network. Preferably each endpoint includes or is in communication with a contacts database for storing personal contact information for the user. In the exemplary illustration on FIG. 1, endpoints 114 comprise a desktop keyset coupled to a personal computer and database.

The communication request (1) is received at the communication system of Steve's former employer, Enterprise A, because caller 120 is not aware that Steve has left Enterprise A employment or is no longer associated with Enterprise A. In other words, the contact information for Steve in address book 121 is not up-to-date with Steve's new contact information or the caller is unaware that Steve has left Enterprise A. System 100 may attempt to connect the communication request from the caller to Steve by looking up Steve's contact information in an enterprise-wide contacts database, such as database 118. This task may reveal that Steve is no longer a user of Enterprise A and thus the system begins looking for forwarding contact information for Steve.

In accordance with the disclosure, the system performs one or more look up functions which provide direction as to how the system will proceed in responding to the communication request for Steve. In one particular embodiment, the system may perform a look up in a database of former users. As an optional feature, Steve and/or the system administrator may have chosen to retain a copy of Steve's address book in a database, such as database 116. As will be discussed in more detail below, particular features may be set to allow Steve to receive redirected communications based on who is attempting communication and/or how long it has been since Steve left Enterprise A. For example, if public caller 120 was a contact in Steve's address book, it may be acceptable for system 100 to redirect the communication to Steve's new contact information.

In one embodiment, the system returns a communication (2) to public caller 120, or rather to public caller's address book 121, which contains the updated address information for Steve that was retrieved during the look up process. For the sake of this example, it is assumed that Steve has started working at Enterprise B and the updated address information corresponds to Steve's new contact information at Enterprise B. The updated information is for the caller's address book to either replace the current entry for Steve, or alternatively, create a new entry for Steve with the information. Additionally, the system may return a command in the same communication (2) or separately, to place a redirected communication to Steve's new contact information. The redirected communication request (3) is sent from public caller 120 to Enterprise B Communication System 130 in an attempt to reach Steve. The redirecting of the communication request may occur without the caller participating or even know it is happening. In another embodiment, system 100 may announce to the caller that Steve is no longer with Enterprise A and the call is or can be redirected to Enterprise B, or a similar type of message may be played.

In lieu of or in addition to sending a redirected communication request (3) to Enterprise B, the system may also send a redirected communication request (4) to another associate of Enterprise A, such as Steve's job replacement. This may include an individual within Enterprise A or a work group that Steve may have been a member of. In one embodiment, the look up function reveals that Steve has been replaced by another individual or work group and to redirect communications accordingly. Additionally, the calling party's address book 121 may be updated with the replacement information, e.g., in a return communication (2) with an update command.

In another embodiment of the present example, Steve, the former employee of Enterprise A, may not want contact information to be sent to a new employer, but rather to an address referral service 125. Steve may provide his contacts with an electronic "find-me" or "v-card." These types of electronic cards typically include information to locate the correct domain that is hosting the address referral service. Address referral services, such as those offered by Yahoo!®, are well established and may host up-to-date copies of various static v-cards commonly in use today. In this example, the communication request (2.5) may be sent to address service 125 where updated contact information (2.7) is sent back to public caller 120 and address book 121. At this point, the communication may be redirected as desired by Steve or the administrator.

As previously mentioned, communication requests are often received at a communication system, such as system 100, where routing and look-up functions may be performed. To further demonstrate the various features and embodiments, a discussion will follow of the look-up operations that may occur in a communication system. The following tables are representative of exemplary look-up tables that may be stored in one or more databases of a communication system, e.g., system 100.

With continued reference to FIG. 1 and the above example, the public caller attempts the communication request (1) for Steve and it is received at Enterprise A Communication System 100. There are a number of known techniques that may be used by the system to determine that Steve is no longer associated with or employed by Enterprise A, or that Steve is not associated with the received address. It is believed that these determinations are beyond the scope of this disclosure, as it is assumed that the received communication request is for a former user of the received address.

In accordance with one aspect of the disclosure, an updated address for Steve (2) is communicated to the public caller. Table I below illustrates a look-up table that may be utilized to facilitate an update to the caller, and particularly an updated address. Although illustrated as electronic addresses, it should be realized that a similar table may be constructed using telephone extension numbers, full or partial names, or any other criteria which may be used to communicate with and locate personnel.

TABLE I

Presence Referral

| Effective Date/Time | Former Address | Forwarding Address | Fadeout Rules |
|---|---|---|---|
| 12/01/04, 12:30 | sdrew@enterprisa.com | sdrew@enterprisb.com | 12, 3, 3 |
| 11/15/04, 23:59 | jdoe@enterprisa.com | johndoe@cox.net | 8, 2, 3 |
| 09/15/04, 08:00 | mrose@enterprisea.com | rose@xyz.com | 10, 13, 6 |

In the present example, the table includes an effective date and time entry field as notification of how long the employee or associate has been gone. This information, when combined with the fadeout rules field may be used to determine how long the referral or redirect will remain in effect and at what level. For example, this particular table includes a fadeout rule for "sdrew@enterprisa.com" of "12, 3, 3". Assume for this example that the fadeout rules are in units of weeks. Contact attempts to the former address of "sdrew@enterprisa.com" may result in a command for automatic redirected communication request to the forwarding address of "sdrew@enterprisb.com" along with the updated address information for a period of 12 weeks (optionally restricted to screened callers, as will be discussed below). Additionally, the caller may be provided the address of "sdrew's" replacement at Enterprise A or redirected to the replacement automatically, for a period of 12 weeks. The next number, "3", may signify that after the initial 12 week period, the communication may not be automatically redirected but rather, only the updated address and/or the replacement information sent back to the caller. Then, for the final 3 weeks, only a notification of the replacement will be sent back to the caller. After this 18 week period, a complete purge of "sdrew's" address may occur and then the system will return an error to the caller in response to communication requests. It should be realized that there are many variations for fadeout rules that are equally useful and considered part of the disclosure.

Continuing with the present example, Table II below illustrates a look-up table that may be utilized to facilitate an update to the caller, and particularly a replacement.

TABLE II

Replacement Referral

| Member | Position | Former Address | Replacement | Replacement Address |
|---|---|---|---|---|
| 100 | HR | sdrew@enterprisa.com | Jill Kessler | jkessler@enterprisa.com |
| 101 | AR | jdoe@enterprisa.com | Bill Goode | bgoode@enterprisa.com |
| 102 | AP | mrose@enterprisa.com | Jim Smith | jsmith@enterprisa.com |

In one particular embodiment, a communication (2) may be sent back to the caller which includes replacement information. Assuming a communication request is received for "sdrew" and it is determined that this person is no longer associated with the company. A look-up confirms that "sdrew" was previously in an "HR" position and the new HR replacement is "Jill Kessler." A return communication to the caller may include a command to automatically redirect the communication request to the replacement address, i.e., "jkessler@enterprisa.com", and/or to update the caller's address book to include contact information for the replacement, i.e., name, address, etc.

Table III illustrates an exemplary look-up table that may be utilized to facilitate an update to the caller, and particularly a replacement.

TABLE III

Replacement Group

| Key | Group | Code | Members |
|---|---|---|---|
| 200 | Human Resource | ADMIN | 100 |
| 201 | Accounts Receivable | ACCTG | 101, 102 |

In another particular embodiment, a communication (2) may be sent back to the caller which includes replacement information for a group that Steve may have been a member of. With combined reference to Tables II and III, the look-up functions may confirm that "sdrew" or Steve, was previously in HR or Human Resource and was member "100." A cross reference to Table III reveals that members listed as 100 are in key group 200. Thus, any current member that is in key group 200 may be able to assist the caller that was attempting to contact Steve. This present example is just another technique which may be used to forward replacement information to the caller and/or redirect the caller to the former employees replacement or group.

The following flowchart is provided to better understand the various steps of operation of the methods for handling communication requests received for former users of a communication system, as described herein. It should be realized that the following description is not intended to be limiting but rather to provide a further description of the various embodiments. It should be appreciated that additional steps may occur that are not represented on the following flowchart but are discussed in the conjoining text or elsewhere herein. Moreover, there may be operations, functions, routines, and the like that are not depicted on the flow or elsewhere but are well understood in the industry as common actions for a communications system. Unless specifically stated, the order of the depicted and described operations is not limited to the description.

Figure 2:
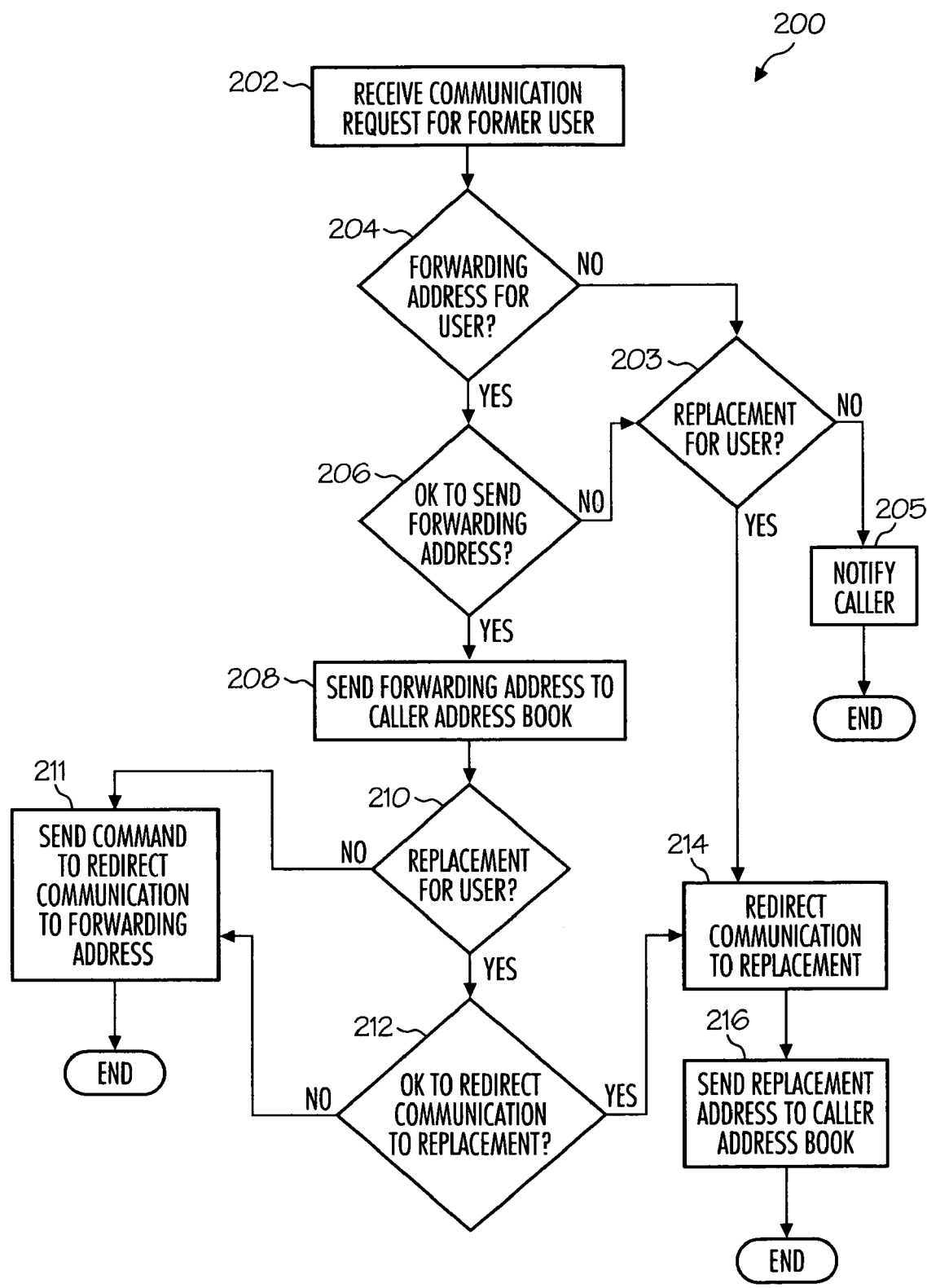
FIG. 2 is a flowchart of exemplary operations of the various methods for handling communication requests for former users of a communication system.

FIG. 2 is a flowchart 200 of exemplary operations of the various methods for handling communication requests for former users of a communication system. The steps may be performed by a communication system of an enterprise (e.g., Enterprise A Communication System 100), a secondary system (e.g., address services 125), or a combination of both.

Initially, a communication request for a former user is received (step 202). The request may be an email, phone call, instant message or any other type of communication attempt. The system performs a look-up to see if the former user has a forwarding address (step 204). If not, then the system may search for a current replacement of the user (step 203). If no replacement is found, then the caller may be notified that the communication attempt has failed (step 205).

If there is a replacement for the former user, then the communication attempt may be redirected to the replacement (step 214). The redirect communication may occur seamlessly without the original caller or sender even realizing that the attempt has been redirected. Alternatively, the caller/sender may be notified that the user is no longer at the received address and the communication is being redirected to someone else. The replacement's address may be sent back to the original caller/sender with a command to update the caller's address book with the replacement's contact information (step 216).

If there is a forwarding address available for the former user, then the system determines whether or not the caller can receive the forwarding address (step 206). There are a number of ways to make this determination. For instance in the previous example above, fadeout rules were applied. The user and/or system administrator determine how long the system will continue to redirect communications to new contact information and/or update caller's address books. The system reviews the time set and decides whether or not this time has expired. Another way is to keep a copy of the former user's address book (e.g., database 116). The user and/or administrator can determine on a call-by-call basis whether or not the updated information is to be sent. If the caller was included as a contact on the user's address book, then the system may permit the caller to receive updated information on the user, otherwise, the system will not send the update. In another example, the user and/or administrator may decide that all callers will receive updated address information for a specific amount of time, such as by a fadeout rule. Alternatively, an administrator or the like may determine and set an appropriate instruction that no callers will receive the forwarding information because, for example, the former user is now associated with a competing company. If it is not permitted to send the forwarding address, then the system checks to see if there if there is a replacement for the former user (step 203). If it is ok to send the forwarding address to update the caller's address book, then the system returns a command to the caller to update the caller's book with the new contact information (step 208). It should be realized that updated information may be to replace a current entry or to create a new entry in the caller's book. In the case of the latter, the system may prompt the caller to accept the creation of the new entry.

The system may either redirect the communication request to the former user's new contact information or to the user's replacement. The system queries whether there is a replacement for the user (step 210) and if not, then the communication may be redirected to the former user's new address (step 211). If there is a replacement for the former user, then the system determines whether it is permitted to redirect the communication to the replacement (step 212). There are various methods to determine if the request should be sent to the replacement. For example, fadeout rules may be used to set a specified time limit to redirect communications to the replacement. The system may review a copy of the former user's address book and if the caller is listed as a contact, then the system may choose to forward to the user and not a replacement. Alternatively, the user and/or administrator may assign a status to each contact on the former user's book, such as "personal" or "business" contact, and as communication requests are received, the status of the caller may be reviewed. Personal contacts may be redirected to the user's new address and business contacts may be redirected to the replacement. Regardless of how the system determines whether or not to send the communication to the replacement, if the communication is to be redirected, then the system sends a command back to the caller to forward the communication request to the replacement (step 214) and may include a command to update the caller's address book with the replacement's address (step 216).

It should be realized that communications sent back to the caller may include multiple commands over a single transmission or a series of transmissions. Further, the actions resulting from the commands may occur without any action on the part of the caller and without the caller even knowing a redirect or update is happening.

Presented herein are numerous systems, methods and techniques for handling communication requests received for a former user of a communication system, including the best mode. Having read this disclosure, one skilled in the industry may contemplate other similar techniques, modifications of structure, arrangements, proportions, elements, materials, and components that fall within the scope of the present invention. Also, various examples have been described herein to facilitate understanding of the methods and operations. These and other changes or modifications are intended to be included within the scope of the disclosure, as expressed in the following claims.

The invention claimed is:

1. A method for handling a communication request received for a former user of a communication system, the method comprising:

receiving, at the communication system, the communication request addressed to the former user of the communication system from a first party, the first party having an address book comprising address information for a plurality of contacts;

determining, by system lookup, that the former user has a forwarding address comprising a new communication information;

considering a set of predetermined fadeout rules comprising one or more time periods and each time period having a start date and time, the fadeout rules established uniquely for the former user by a system administrator;

determining, by system lookup from the fadeout rules, that the communication request is received during one of the time periods and the forwarding address is allowed to be sent from the communication system to the address book of the first party; and sending a command to the first party address book to update the book with the new communication information for the former user, whereby, the former user is not required to take any action to establish the fadeout rules and update the first party address book.

2. The method of claim 1, wherein the first party address book is updated without further action required from the first party.

3. The method of claim 1, further comprising prompting the first party to accept an update to the address book.

4. The method of claim 1, further comprising determining from the fadeout rules that the communication request is allowed to be redirected to the forwarding address and sending a command to the first party to redirect the communication request.

5. The method of claim 1, further comprising determining the former user has a replacement user of the communication system and determining from the fadeout rules that the replacement user is allowed to receive the communication request and redirecting the communication request to the replacement user.

6. The method of claim 1, further comprising redirecting the communication request to an assigned replacement user of the communication system.

7. The method of claim 6, further comprising sending a command to the first party address book to update the book with address information for the replacement user.

8. The method of claim 1, further comprising referring to a replication of a contacts list comprising communication information for a plurality of contacts associated with the former user.

9. A method for handling a communication request received for a former user of a communication system, the method comprising:

receiving, at a private branch exchange of the communication system, the communication request addressed to the former user of the communication system from an initiating system;

determining, by system lookup, that the former user has a forwarding address comprising a new contact information;

considering a set of predetermined fadeout rules comprising one or more time periods and each time period having a start date and time, the fadeout rules established uniquely for the former user by a system administrator;

determining, by system lookup from the fadeout rules, that the communication request is received during one of the time periods and is allowed to be redirected to the forwarding address; and sending a command to the initiating system to redirect the communication request to the forwarding address of the former user, whereby, the former user is not required to take any action to establish the fadeout rules and redirect the communication request.

10. The method of claim 9, further comprising sending a command to the initiating system to update an address book with the forwarding address for the former user.

11. The method of claim 9, further comprising referring to a replication of a contacts list comprising communication information for a plurality of contacts associated with the former user.

12. The method of claim 11, further comprising assigning a status to each contact on the contact list and the status of the initiating system further determines the communication request is allowed to be redirected.

13. A method for handling a communication request received for a former user of a communication system, the method comprising the steps of:

receiving, at the communication system, the communication request addressed to the former user of the communication system from a first party, the first party having an address book comprising communication information for a plurality of contacts associated with the first party;

referring, by system lookup, to a replication of a contacts list comprising communication information for a plurality of contacts associated with the former user;

considering a set of predetermined fadeout rules comprising one or more time periods and each time period having a start date and time, the fadeout rules established uniquely for the former user by a system administrator;

determining, by system lookup from the replication and the fadeout rules, that the communication request is received during one of the time periods and is allowed to be redirected to a forwarding address of the former user;

determining, by system lookup from the replication and the fadeout rules, the forwarding address of the former user is allowed to be sent to update the address book of the first party; and sending a command to the first party to perform actions in response to the determining steps, whereby, the former user is not required to take any action to establish the fadeout rules, redirect the communication request, and update the first party address book.

14. The method of claim 13, wherein the first party address book is updated without further action required from the first party.

15. The method of claim 13, further comprising prompting the first party to accept an update to the address book.

16. The method of claim 13, further comprising assigning a status to each contact on the contacts list and the status of the first party further determines the communication request is allowed to be redirected.

17. The method of claim 16, wherein assigning the status comprises either a personal status or a business status and the communication request is redirected if the first party is a personal status and is not redirected if the first party is a business status.

* * * * *